US009913213B2

(12) United States Patent
Vesterinen et al.

(10) Patent No.: US 9,913,213 B2
(45) Date of Patent: Mar. 6, 2018

(54) METHODS, DEVICES AND COMPUTER PROGRAM PRODUCTS PROVIDING FOR RAN BASED LGW SELECTION

(75) Inventors: Seppo Ilmari Vesterinen, Oulunsalo (FI); Gyorgy Tamas Wolfner, Budapest (HU); Robert Zaus, Munich (DE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 14/130,691

(22) PCT Filed: May 29, 2012

(86) PCT No.: PCT/EP2012/060002
§ 371 (c)(1),
(2), (4) Date: Jan. 3, 2014

(87) PCT Pub. No.: WO2013/004435
PCT Pub. Date: Jan. 10, 2013

(65) Prior Publication Data
US 2014/0133476 A1   May 15, 2014

(30) Foreign Application Priority Data

Jul. 7, 2011   (WO) .................. PCT/EP2011/061528

(51) Int. Cl.
*H04W 48/20*   (2009.01)
*H04W 48/18*   (2009.01)
(Continued)

(52) U.S. Cl.
CPC .......... *H04W 48/20* (2013.01); *H04W 48/18* (2013.01); *H04W 76/022* (2013.01); *H04W 88/16* (2013.01)

(58) Field of Classification Search
CPC .................................................. H04W 48/20
(Continued)

(56) References Cited

U.S. PATENT DOCUMENTS 8,339,991 B2 * 12/2012 Biswas et al. ................ 370/254
2004/0114613 A1 * 6/2004 Mercuriali et al. ........... 370/401
(Continued)

FOREIGN PATENT DOCUMENTS

WO   WO 2010/115459 A1   10/2010
WO   WO 2011/069119 A2   6/2011
WO   WO 2011/078756 A1   6/2011

OTHER PUBLICATIONS

3GPP TSG SA WG2 Meeting #84, TD S2-111625, Apr. 11-15, 2011.*
(Continued)

*Primary Examiner* — Mark Rinehart
*Assistant Examiner* — Peter G Solinsky
(74) *Attorney, Agent, or Firm* — Squire Patton Boggs (US) LLP (57) ABSTRACT

The present invention proposes methods, devices and computer program products in relation to enhancements for providing for RAN based LGW selection. Two basic options for the RAN based improved solution are presented for scenarios in which HeNB sends a list of the available LGW addresses/identities and the APNs supported by the different LGWs. According to option 1, if more than one LGW can support a given APN, then the H(e)NB only sends the address of the preferred LGW (e.g., based on local network topology) for the given APN. According to option 2, the HeNB sends priority value (s) with the addresses of the LGWs (for the LGWs only (irrespective of supported APNs) or for (only) the APNs supported by each LGW. Then, the MME/SGSN may consider this priority value (s) at the LGW selection.

9 Claims, 4 Drawing Sheets (51) Int. Cl.
*H04W 88/16* (2009.01)
*H04W 76/02* (2009.01)

(58) Field of Classification Search
USPC .......................................................... 370/338
See application file for complete search history.

(56) References Cited

U.S. PATENT DOCUMENTS

| | | | |
|---|---|---|---|
| 2007/0030855 A1* | 2/2007 | Ribiere et al. ................ | 370/401 |
| 2008/0274739 A1* | 11/2008 | Wu ............................ | 455/435.1 |
| 2009/0285179 A1* | 11/2009 | Jones et al. .................... | 370/331 |
| 2009/0287922 A1* | 11/2009 | Herwono ............. | H04L 9/0822 713/155 |
| 2010/0281151 A1* | 11/2010 | Ramankutty ......... | G06F 15/173 709/223 |
| 2011/0143667 A1* | 6/2011 | Cugnini et al. ............. | 455/41.2 |
| 2011/0170469 A1* | 7/2011 | Watfa .................... | H04W 48/17 370/312 |
| 2011/0189986 A1* | 8/2011 | Tinnakornsrisuphap et al. ......... | 455/422.1 |
| 2011/0225632 A1* | 9/2011 | Ropolyi et al. ................... | 726/4 |
| 2011/0228750 A1* | 9/2011 | Tomici .................. | H04W 8/082 370/338 |
| 2012/0084449 A1* | 4/2012 | Delos Reyes et al. ....... | 709/229 |
| 2012/0094643 A1* | 4/2012 | Brisebois .............. | H04W 8/245 455/418 |
| 2012/0127974 A1* | 5/2012 | Doppler ................ | H04W 76/02 370/338 |
| 2012/0178416 A1* | 7/2012 | Miklos .............. | H04L 29/12066 455/410 |
| 2012/0182912 A1* | 7/2012 | Watfa ................ | H04W 36/0022 370/311 |
| 2012/0207129 A1* | 8/2012 | Sun ..................... | H04W 76/027 370/331 |
| 2012/0257598 A1* | 10/2012 | Karampatsis ......... | H04W 8/082 370/331 |
| 2012/0275310 A1* | 11/2012 | Watfa ................... | H04W 8/082 370/238 |
| 2012/0302197 A1* | 11/2012 | Koontz ............... | H04W 52/028 455/404.2 |
| 2013/0003697 A1* | 1/2013 | Adjakple .......... | H04W 36/0011 370/331 |
| 2013/0003699 A1* | 1/2013 | Liu ....................... | H04W 8/082 370/331 |
| 2013/0089076 A1* | 4/2013 | Olvera-Hernandez | H04W 36/08 370/332 |
| 2014/0059192 A1* | 2/2014 | Miklos .................. | H04W 8/082 709/221 |
| 2014/0105145 A1* | 4/2014 | Gao .................... | H04W 84/045 370/329 |

OTHER PUBLICATIONS

International Search Report and Written Opinion dated Sep. 24, 2012 corresponding to International Patent Application No. PCT/EP2012/060002.
3GPP TR 23.859 V0.3.1 (Jun. 2011), Technical Specification, 3rd Generation Partnership Project; Technical Specification Group Services and System Aspects; LIPA Mobility and SIPTO at the Local Network; (Release 11), vol. SA WG2, No. Naantali, 20110711; XP050548316; pp. 1-22.
3GPP TR 23.859 V0.3.0 (May 2011), Technical Specification, 3rd Generation Partnership Project; Technical Specification Group Services and System Aspects; LIPA Mobility and SIPTO at the Local Network; (Release 11), pp. 1-22.
3GPP TS 23.401 V10.4.0 (Jun. 2011), Technical Specification, 3rd Generation Partnership Project; Technical Specification Group Services and System Aspects; General Packet Radio Service (GPRS) enhancements for Evolved Universal Terrestrial Radio Access Network (E-UTRAN) access (Release 10), 281 pages.
3GPP TS 23.060 V10.4.0 (Jun. 2011), Technical Specification, 3rd Generation Partnership Project; Technical Specification Group Services and System Aspects; General Packet Radio Service (GPRS); Service description; Stage 2 (Release 10), 321 pages.

* cited by examiner

METHODS, DEVICES AND COMPUTER PROGRAM PRODUCTS PROVIDING FOR RAN BASED LGW SELECTION

FIELD OF THE INVENTION

The present invention relates to methods, devices and computer program products providing for RAN based LGW selection.

More specifically, the present invention relates to such methods, devices and computer program products which are configured to enable and improve RAN based LGW selection in mobile communication systems such as UTRAN, E-UTRAN or LTE/LTE-A, or any other or similar system, which support a local IP access (LIPA) feature, i.e. a feature enabling access to a packet data network PDN (such as the Internet or virtual private network VPN, or the like) via a local gateway LGW from a Home NodeB or Home evolved NodeB (HNB, HeNB) as an example of a network transceiver station defining in its area of coverage a so-called femto or pico cell, and within which area of coverage a user's terminal or user equipment UE may reside and communicate.

BACKGROUND

As an example for exemplifying the present invention, it is referred hereinafter to mobile data transmission and data services, which are constantly making progress, and which lead to sophisticated communication network developments such as LTE/LTE-A systems.

In this regard, 3GPP Rel-10 is introducing a so-called Local IP Access (LIPA) functionality in E-UTRAN and UTRAN systems. Such feature enables the access of local IP networks from femto cells, which are called Home NodeBs (HNB) and Home eNodeBs (HeNB) in 3GPP specifications. An outline of an architecture solution is specified in 3GPP TS 23.401 and 23.060. In 3GPP Rel-11, such feature is to be enhanced with mobility support. The present description refers by mere way of example only to the terminology as adopted in those environments, but of course, the teaching outlined herein below will be applicable to other environments using different terminology. That is, a similar feature like LIPA can be established involving any terminal such as a UE, via any network transceiver device such as a HeNB, via any (local) gateway such as a LGW, towards any (local) IP network and/or PDN.

In Rel-10 the HeNB and the (single) Local Gateway (LGW), which provides the connectivity to the local IP network, are collocated. The HeNB sends the collocated LGW address to the MME/SGSN, and if the MME/SGSN decides to establish a LIPA connection, then it uses the provided address as the LGW address.

In the subsequent Rel-11, the LIPA feature is enhanced by allowing a standalone LGW and there can be more than one LGW in a local network. That is, a respective HeNB may have connectivity to plural LGW's rather than only to a single (collocated) LGW.

Therefore, in such scenarios, some mechanism needs to be specified how a LGW is selected for LIPA access.

3GPP TR 23.859 version 0.3, Section 5.2.2, describes already two basic options for LGW selection: a DNS (domain name server) based solution and a RAN (radio access network) based solution.

In the DNS based solution, LGW addresses are registered in a domain name server, DNS, of the network's operator and then the MME/SGSN performs a DNS query as it does in other cases with specific parameters: requested APN, Local HeNB Network identifier.

In the RAN based solution the H(e)NB sends a list of the available LGW addresses/identities and for each LGW, the APNs supported by the respective LGW to the MME/SGSN, and then for the specific APN requested by the UE, the MME/SGSN selects one appropriate LGW from that list.

In this regard, it is noted that in LTE (or E-UTRAN) the HeNB itself does not know the APN requested by the UE, as this information is transferred encrypted from the UE to the MME.

Therefore, the HeNB is not capable of finally selecting the LGW to be used for a requested connection.

The RAN-based solution, however, imposes a certain increased signaling on the interface between HeNB and MME/SGSN. Moreover, by furnishing all the information concerning the local network, i.e. on available LGW s and their supported access nodes, towards the MME/SGSN, the network topology is revealed to the MME/SGSN. If the local network constituted by one or more HeNB's is a company network while the MME is part of a public operator's LTE/UMTS network, this can raise security issues.

Thus, there is still a need for further improvement in terms of RAN based LGW selection.

SUMMARY

The present invention addresses such situation and proposes, in exemplary embodiments, new solutions to efficiently provide methods, apparatuses and computer program products, respectively, for RAN based LGW selection.

Various aspects and related examples of the invention are set out in the claims.

According to a first aspect of the present invention, there is provided a device, comprising at least: a controller module, configured to maintain configuration data of a plurality of gateway devices and access points, with which the device has connectivity, each access point being associated to at least one of the plurality of gateway devices, wherein at least the device and the gateway devices form part of a network having a network topology, receive a request for connection via an access point from a terminal, determine a group of gateway devices associated with each access point associated to at least one gateway device, determine preferences for at least one gateway device of the group based on the prevailing network topology, and inform a network management node about the access points and the preferences determined for each access point.

Advantageous further developments are as set out in respective dependent claims thereof.

According to a second aspect of the present invention, there is provided a method, comprising: maintaining configuration data of a plurality of gateway devices and access points, with which a device has connectivity, each access point being associated to at least one of the plurality of gateway devices, wherein at least the device and the gateway devices form part of a network having a network topology, receiving a request for connection via an access point from a terminal, determining a group of gateway devices associated with each access point associated to at least one gateway device, determining preferences for at least one gateway device of the group based on the prevailing network topology, and informing a network management node about the access points and the preferences determined for each access point.

Advantageous further developments are as set out in respective dependent claims thereof.

According to a third aspect of the present invention, there is provided a computer program product including a program comprising software code portions or, stated in other terms, computer-executable components being arranged, when run on a processor/computer of a device, to perform/implement the method according to the aforementioned second aspect of the present invention. Such computer program product may be embodied as a computer-readable storage medium.

Thus, improvement is achieved by those methods, devices and computer program products, in connection with at least exemplary embodiments and/or aspects. Specifically, an advantage of the enhancements proposed is that the local network topology (and other local network issues) can be considered during the LGW selection without providing detailed local network information to the core network, as the local network topology information might be confidential in an enterprise scenario. Another advantage of the enhancements proposed is that the thus proposed solution is applicable for/in all radio access technologies (including e.g. UTRAN, E-UTRAN, LTE-A, . . . ).

BRIEF DESCRIPTION OF DRAWINGS

For a more complete understanding of aspects and/or example embodiments of the present invention, reference is now made to the following description taken in connection with the accompanying drawings in which.

DESCRIPTION OF EXEMPLARY EMBODIMENTS

Exemplary aspects and/or embodiments of the invention will be described herein below.

It is to be noted that the following exemplary description refers to a scenario as described in outline in 3GPP TR 23.859 VO.3.0 (2011-05). In brief, a local HeNB network comprises a plurality of HeNBs having connectivity in terms of a LIPA feature to at least one local packet data network PDN. Connectivity between a respective HeNB and a PDN is established via a respective one among one or more local gateway (s) LGW. Each HeNB is configured so as to have knowledge of the available LGWs addresses and the access point names APN a respective LGW supports. Thus, each HeNB is aware of the APN or APNs supported by a respective LGW to which it has connectivity.

However, it is to be understood that this serves for explanatory purposes only. Thus, focusing in the subsequent description and explanation to such an example scenario is by no way intended to be construed as limiting the scope of the present invention.

Figure 1:
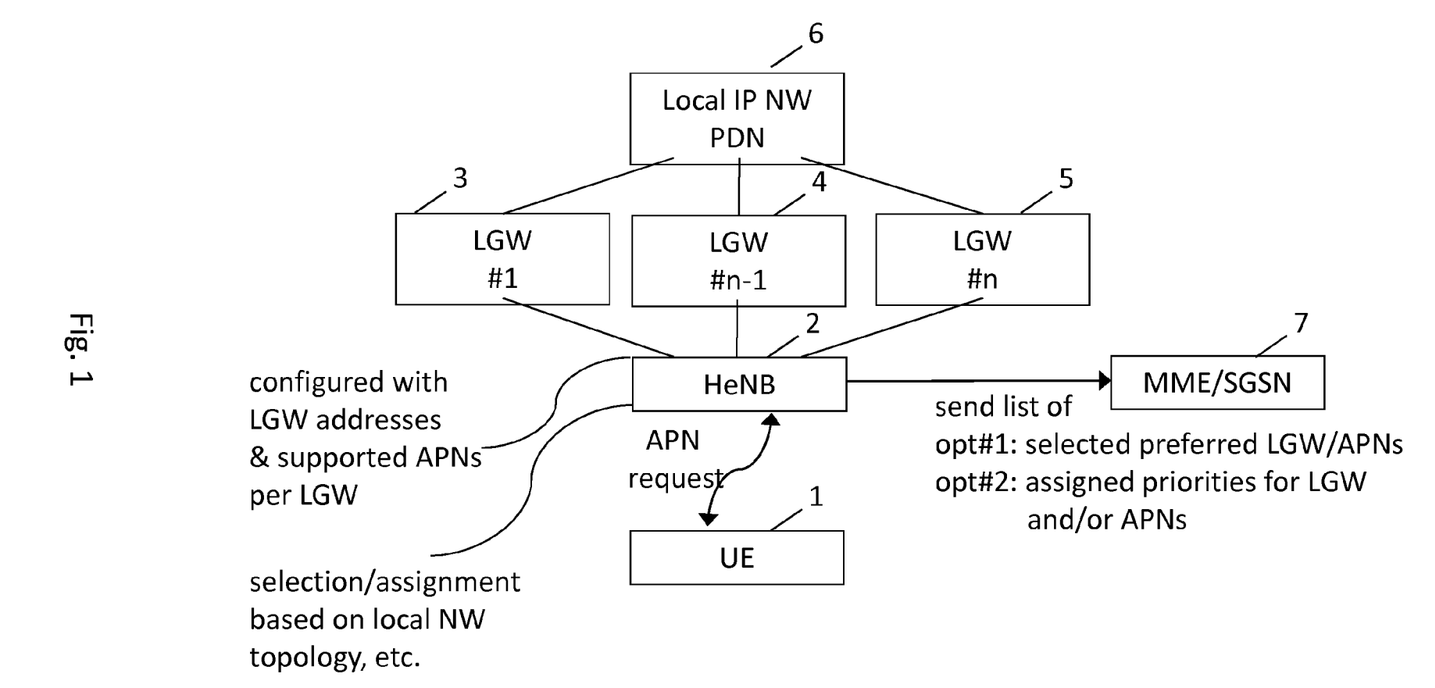
FIG. 1 schematically illustrates at least parts of a network arrangement in relation to exemplary aspects of the present invention.

FIG. 1 schematically illustrates at least parts of such or similar network arrangement in relation to exemplary aspects of the present invention. FIG. 1 shows in schematic overview at least some network entities and/or a terminal involved in a local IP access (LIPA) environment.

A terminal such as a user equipment UE is denoted with 1. Such user equipment is for example a mobile phone or smartphone or personal digital assistant PDA. Generally, examples of devices as given herein are given with the specific reference to the terminology as adopted for example in E-UTRAN and/or UTRAN or LTE/LTE-A. However, they are not limited to those specific devices as occurring in those standards but are generally understood that they serve as a mere example only.

Furthermore, the UE 1 communicates with a network transceiver station HeNB (home evolved node B for mobile communication). Via this HeNB denoted with numeral 2, the UE 1 can access a local IP based network such as a packet data network PDN (denoted with 6) via at least one local gateway LGW. FIG. 1 illustrates only one HeNB 2, although plural HeNBs are generally present, and a user equipment UE may roam between those HeNBs. The HeNB communicates with a mobility management entity MME and/or a serving GPRS support node SGSN denoted with 7. This entity MME/SGSN 7 then initiates appropriate action for the UE being enabled to enter into communication/a session with the local IP network via the HeNB and one of the local gateways LGW. The local gateways LGW are denoted with 3, 4, 5. Note that also plural PDNs may be present and that a respective LGW may connect to more than one PDN. Though, in order to keep the drawing and its explanation at a reasonable complexity, only one PDN 6 is illustrated in FIG. 1.

If the terminal UE 1 wishes to use the local IP access, LIPA, functionality in such network scenario, it issues an APN request (APN=access point name) towards the HeNB 2. The HeNB 2, in cooperation with the MME/SGSN 7, then establishes the required functionality/connectivity towards the local IP network 6 via one of the local gateways LGW 3, 4, 5.

Briefly stated, according to at least exemplary aspects of the present invention, HeNB 2 sends information towards the MME/SGNS as follows:

Exemplary Embodiment 1/Option 1

The HeNB performs a selection of the appropriate pairs of LGW/APN for each APN supported by at least one of the LGWs, i.e. "preferred" LGWs for each supported APN, and sends this result towards the MME/SGSN. As mentioned above, the HeNB itself cannot do the final selection, as the APN requested by the UE is transferred encrypted from the UE to the MME. So, the HeNB includes one "preferred" LGW for each possible (supported) APN.

Exemplary Embodiment 2/Option 2

The HeNB assigns priorities to the LGWs and sends those assigned priorities of the LGWs towards to the MME/SGSN.

The selection and/or priority assignment as performed by the HeNB, in at least exemplary embodiments of the present invention, is based on local network criteria. Those local network criteria may reside in the load imposed on an individual LGW, and/or a location of such LGW, and/or a load distribution among plural LGW's, and/or the location of the HeNB, and/or network topology in general.

The MME/SGSN finally selects the APN based on the requested APN and subscription information and local configuration (e.g. it may change the requested APN) and then it selects the LGW for the selected APN based on the information received from the H(e)NB. Thus, the H(e)NB shall send LGW information for (all supported) APNs, upon which the MME/SGSN can base the final selection.

The above basic principles of exemplary embodiments will be described in more detail herein below as they describe enhancements for the RAN based solution when the HeNB sends a list of the available LGW addresses/identities and the APNs supported by the different LGWs.

Exemplary Embodiment 1 (Option 1)

In option 1, if more than one LGW can support a given APN, then the HeNB only sends the address of the preferred LGW (e.g., based on local network topology and/or other criteria, cf. above) for the given APN, respectively. The preferred LGW can be selected in the local network based e.g. on location, or load, or a load distribution can be applied. There is no need to standardize how the HeNB selects the preferred LGW, and the core network should not know about the mechanism applied in the local network.

Example A

If LGW1 supports APN1 and LGW2 supports APN1, and
if LGW1 is preferred over LGW2 in the local network, then
only the address of LGW1 is sent.

Example B

If LGW1 supports APN1 and LGW2 supports APN1 and APN2, and
if LGW1 is preferred over LGW2 in the local network, then
only APN2 is indicated as supported APN at the address of LGW2.

That is, each supported APN occurs only once in the complete list of "LGW addresses/identities with their supported APNs", i.e. preferences being determined for each access point.

Figure 2:
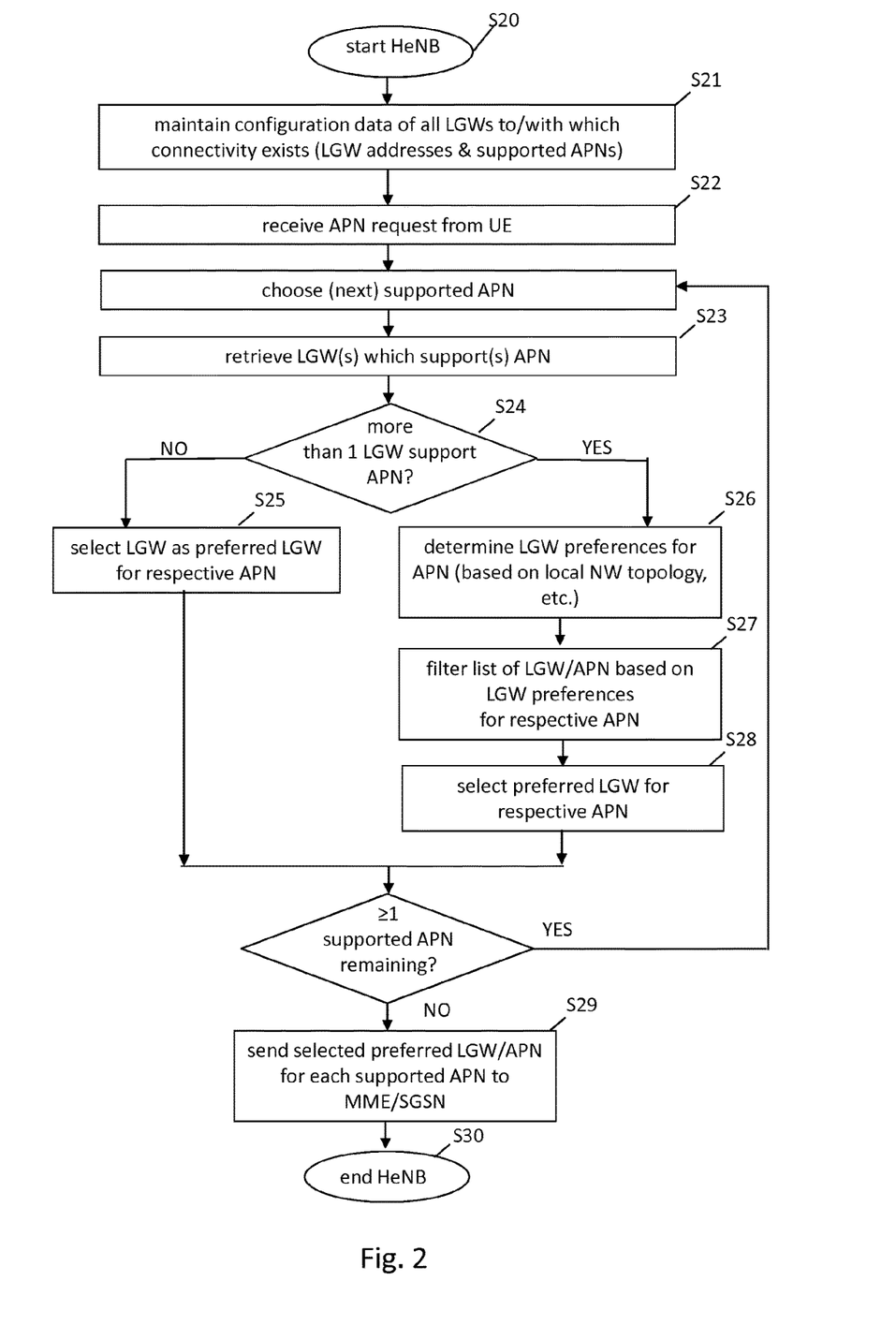
FIG. 2 schematically illustrates a flowchart of an exemplary first method as carried out by and implemented at a control module of a HeNB involved.

This will be set out in greater detail with reference to FIG. 2. FIG. 2 schematically illustrates a flowchart of an exemplary first method as carried out by and implemented at a control module of a HeNB involved.

FIG. 2 illustrates a flowchart of steps performed at a HeNB side. More specifically, FIG. 2 illustrates a flowchart of steps performed at a control module (not separately shown in FIG. 1) implemented at the H(e)NB in relation with at least an exemplary embodiment of the present invention. That is, FIG. 2 illustrates activities of the H(e)NB in relation to the above outlined option 1.

The process starts in step S20. In a subsequent step S21 the HeNB maintains configuration data of all LGW s with which connectivity exists. Thereafter, in step S22 the HeNB receives an APN request from a UE.

In this regard, as mentioned before, it is noted that the HeNB receives the APN request, wherein the requested APN is encrypted in a way that only the MME can decrypt it, and wherein the MME can still change (replace) the requested APN. Thus, the HeNB cannot finally consider which APN was requested by the UE, and it shall send LGW addresses/identities for all supported APNs. In the subsequent step S23, the HeNB retrieves those local gateways LGWs which support a respective APN of any one of the available APNs.

Thereafter, in step S24, the HeNB checks, whether more than one LGW support the respective one of the available APNs. If not (NO in S24), the flow proceeds to step S25. In step S25, the HeNB selects the one LGW as the preferred LGW for the respective one of the available APNs. If this was the last supported APN to be considered, then in a step S29, the selected/preferred LGW's address, for each of the supported APNs, is sent to the MME/SGSN. Thereafter, the flow proceeds to S30 and the procedure at the HeNB ends.

If, however, in step S24 the check reveals that more than one LGW support the respective one of the available APNs, then the HeNB performs a selection/filtering process for the respective one of the available APNs. That is, in step S26, the HeNB determines LGW preferences for the respective one of the available APNs, wherein the preferences depend on local network criteria as mentioned beforehand, i.e. load for the LGW/LGWs, location of the LGW/LGWs and/or load distribution of plural LGWs, location of HeNB, network topology, or the like. Thereafter, in a step S27, the HeNB filters the list of LGWs based on the LGW preferences determined beforehand for the respective APN.

Then, in a subsequent step S28, the preferred LGW for the respective APN is selected. If this was the last supported APN to be considered, then in a step S29, the selected/preferred LGW's address, for each of the supported APNs, is sent to the MME/SGSN. Thereafter, the flow proceeds to S30 and the procedure at the HeNB ends.

As illustrated in FIG. 2, a loop is provided for accomplishing that the respective operations are carried out for each supported APN, respectively. Thereby, in the case of YES in step S24 the steps S26 through S28 are carried out for each APN, respectively, and in the case of NO in step S24 the step S25 is carried out for each APN, while the step S29 is carried out for the entirety of APNs, i.e. the sending of the result of the previous process is sent in one go to the MME/SGSN.

The determination, filtering and selection will be explained with referenced to a particular example as follows:

Assume three LGW's (LGW 1, 2 and 3) to exist. Assume further that each of those LGW's supports the following APN's for access:
LGW 1: APN 1,
LGW 2: APN 1, 2, 3,
LGW 3: APN 1, 2.

Assume further, that for local network criteria as mentioned before, the preference/priority among LGW's 1, 2, 3 is as follows:
LGW 1,
LGW 3,
LGW 2.

Then, it can be seen that for APN 1, this APN is supported by all three LGW's. Therefore, under the assumption that LGW 1 has the highest priority, and for APN 1, the filtering means that APN 1 is erased from such table for LGW's 2 and 3. Moreover, apparently, APN 2 is supported by LGW 2 and 3. Then, under the assumption that LGW 3 has a higher priority/preference compared to LGW 2, APN 2 will be erased from LGW 2. For LGW 2, then only APN 3 will remain in the list while, likewise, for LGW 3, only APN 2 will remain in the list.

Thus, the filtered list will read
LGW 1: APN 1,
LGW 2: APN 3, and
LGW 3: APN 2.

Based on a thus filtered list, an incoming request can easily be processed and the LGW can be selected (step S28) and subsequently informed/sent (step S29) to the MME/SGSN.

Thus, in the FIG. 2, steps S26 to S29 will mainly be performed for APNs 1 and 2 because those APNs are supported by more than one LGW. If, however, the APN is APN 3, step S24 will reveal that this APN is supported only by LGW 2 and then this LGW 2 address will be selected as preferred LGW. Namely, the respective steps S26 to S29 will only be applied for the two APNs 1 and 2, while the result for both APNs is sent together with the result for APN 3 in one go in step S29. This reduces the processing load on the HeNB in such a scenario.

Exemplary Embodiment 2 (Option 2)

Briefly, in option 2, the HeNB sends priority value (s) with the addresses of the LGWs, and then the MME/SGSN considers this priority value (s) upon LGW selection.

For example, an implementation of option 2 can be as given in

Example C

Each LGW receives a single priority value, i.e. the priority of an LGW does not depend on the APN. E.g. in order to avoid extra parameters to be transmitted, the order of the LGW addresses can give an implicit priority for the LGWs.

An alternative implementation of option 2 could be as given in

Example D

The HeNB sends a priority value for each APN indicated with the address of the associated LGW, and then, for the specific APN requested by the UE (or being replaced by the MME/SGSN), the MME/SGSN should consider these priority values at the LGW selection.

An example of such a list could be:
LGW1 (APN 1, Prio=2; APN 2, Prio=1),
LGW2 (APN 1, Prio=1; APN 3, Prio=2),
LGW3 (APN 1, Prio=3; APN 3, Prio=1), etc.

Figure 3:
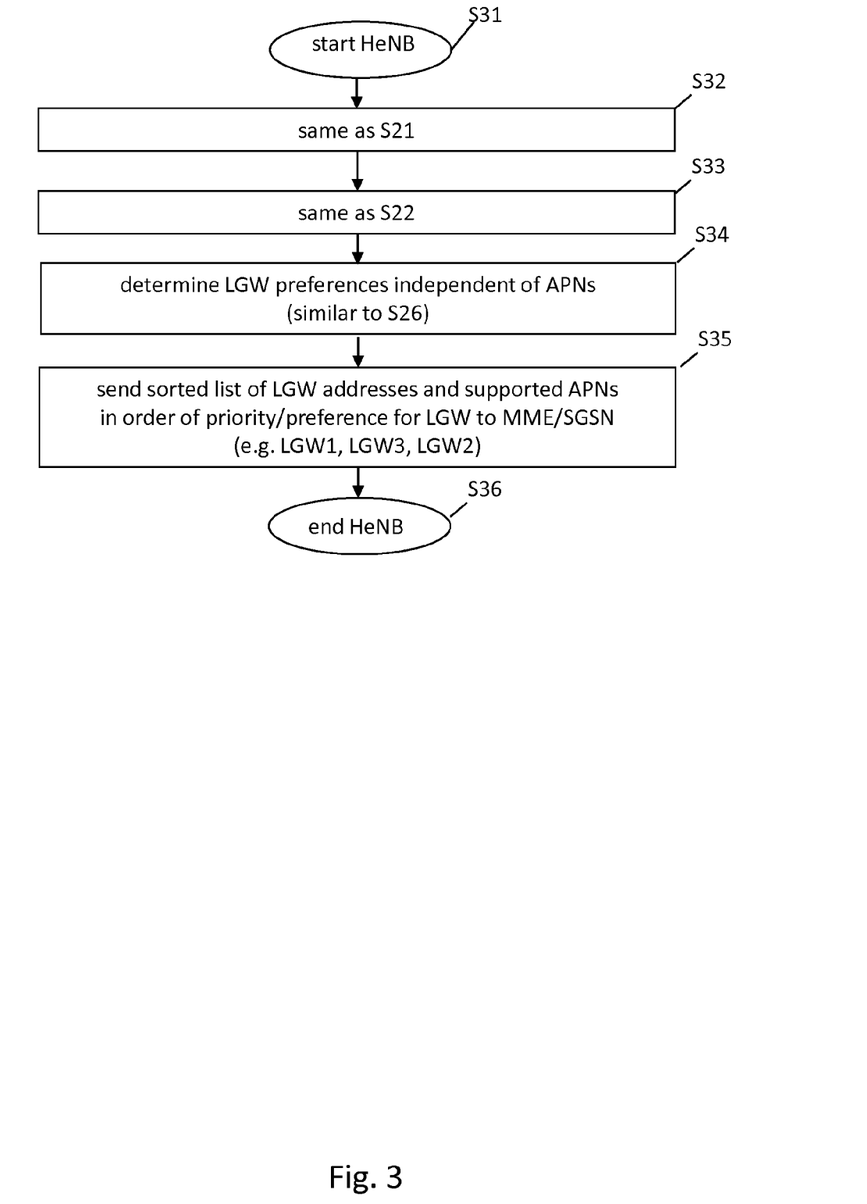
FIG. 3 schematically illustrates a flowchart of an exemplary second method as carried out by and implemented at a control module of a HeNB involved.
Figure 4:
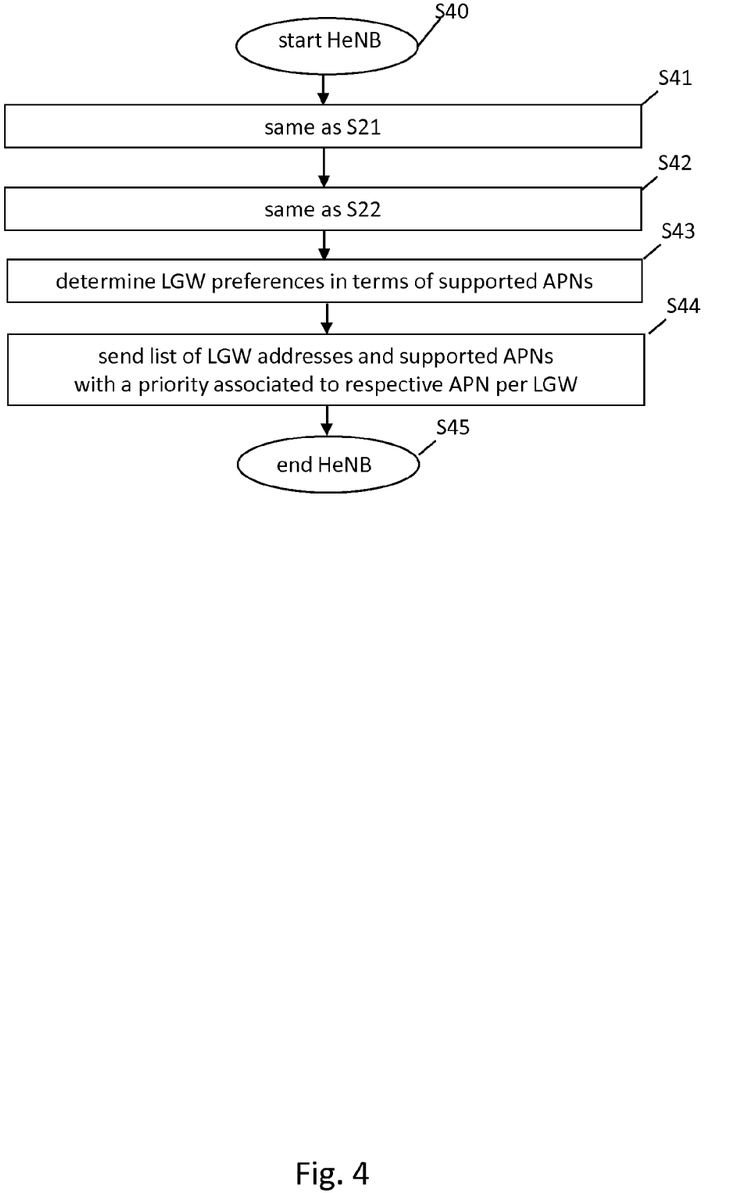
FIG. 4 schematically illustrates a flowchart of an option of an exemplary second method as carried out by and implemented at a control module of a HeNB involved.

This will be set out in greater detail with reference to FIGS. 3 and 4.

FIG. 3 schematically illustrates a flowchart of a first variation of an exemplary second method as carried out by and implemented at a control module of a HeNB involved.

FIG. 3 is a flow chart showing processing/steps carried out by a control module implemented to the HeNB according to a second option as outlined above.

The process starts in a step S31. In a following step S32, the HeNB maintains configuration data of all LGWs to/with which connectivity exits. Step S32 is thus identical to step S21. In a following step S33, which is identical to step S22, the HeNB receives an APN request from a UE. Then, in step S34, which is similar to step S26, the LGW preference is determined by the HeNB. Note, however, that in step S34, the LGW preference is independently determined of any APN supported by the LGW, while in step S26 the LGW preference was determined taking into account to a certain extent the supported APN's. In a subsequent step S35, the sorted list of LGW addresses and the respective supported APN's are then sent to the MME/SGSN.

In order to avoid extra parameters, the order of the sending of the LGW addresses will reflect implicitly the priority assigned for the LGW's. With reference to the example given in connection with the description of FIG. 2, the priority/preference of the LGW's was assumed to be determined as 1, 3, 2.

Then, in this scenario according to option 2, the LGW addresses and their supported APN's will also be sent to the MME/SGSN in the sequence
LGW 1,
LGW 3,
LGW 2.

Thereafter, the processing at the H(e)NB ends in a step S36.

FIG. 4 schematically illustrates a flowchart of a second variation of an exemplary second method as carried out by and implemented at a control module of a HeNB involved.

FIG. 4 is a flow chart showing a second variation of option 2. Likewise, the process starts in a step S40 at the HeNB. Thereafter, in a step S41, the configuration data of all LGWs with/to which connectivity exits are maintained. Step S41 is thus identical to S21 or S32. Thereafter, in a step S42, an APN request is received from a UE. Step S42 is thus identical to S22 or S33. Thereafter, in a step S43, the LGW preferences in terms of the supported APNs are determined. Insofar, step S43 is substantially identical to step S26. Again, the determination of such preferences depends, as in option 1 and option 2 in its exemplary embodiment described with reference to FIG. 3, on local network criteria such as load for an individual LGW, load distribution among plural LGWs and/or location of an LGW and/or the HeNB receiving the request.

Once the preferences/priorities were determined, in a following step S44, the LGW addresses and the supported APNs with the associated APN priority will be sent to the MME/SGSN, where after the process, from the HeNB point of view, ends in step S45.

With reference to the example given under the assumptions made with reference to FIG. 2, such a list could look as follows: (In this regard, the sequence of the listed APNs per LGW could reflect their assigned priority in this case.)
LGW 1: APN 1;
LGW 2: APN 3, 2, 1,
LGW 3: APN 2, 1.

In this regard, it could be beneficial to use "place holders" in the list so as to ensure an appropriate assignment of priorities in such implicit manner. For example, for the above example, when assuming that LGW 3 is supporting only APN 1 with a priority lower than LGW1 and higher than LGW 2, then the line for LGW 3 would look like: LGW 3: APN 1, and when comparing this with the first line "LGW 1: APN 1", it could not be clear whether LGW 1 or LGW 3 is preferred. With a "place holder" the third line could be modified to read "LGW 3: APN x, 1", so that APN 1 gets priority 2.

It is noted that the priority of APNs may be explicitly indicated, as shown in the related preceding Example D.

Another alternative would be to group the LGW addresses per APN and send the LGW addresses then in priority order, as shown below:
APN 1 (LGW1, LGW3, LGW2), APN 2 (LGW3, LGW2), APN 3 (LGW2).

It is to be understood that embodiments of the present invention according to the first and/or second aspect mentioned herein above may be implemented in software, hardware, application logic or a combination of software, hardware and application logic. The software, application logic and/or hardware generally, but not exclusively, may reside on a control module of a network transceiver device such as a H(e)NB. Such control module may form part of a digital signal processor DSP or an application specific integrated circuit ASIC or the like. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer or smart phone, or user equipment.

If desired, at least some of different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The present invention proposes methods, devices and computer program products in relation to enhancements for providing for RAN based LGW selection. Two basic options for the RAN based improved solution are presented for scenarios in which HeNB sends a list of the available LGW addresses/identities and the APNs supported by the different LGWs. According to option 1, if more than one LGW can support a given APN, then the H(e)NB only sends the address of the preferred LGW (e.g., based on local network topology) for the given APN. According to option 2, the HeNB sends priority value (s) with the addresses of the LGWs (for the LGWs only (irrespective of supported APNs) or for (only) the APNs supported by each LGW). Then, the MME/SGSN may consider this priority value (s) at the LGW selection.

The invention claimed is:

1. A radio access network device, comprising at least:
at least one memory comprising computer program code;
at least one processor;
wherein the at least one memory and the computer program code are configured, with the at least one processor, to cause the apparatus at least to:
maintain configuration data of a plurality of gateway devices and access points, with which the radio access network device has connectivity, each of the access points being associated to at least one of the plurality of gateway devices, wherein the radio access network device and the plurality of gateway devices form part of a network having a network topology,
receive a request for connection via at least one of the access points from a terminal,
determine a group from the plurality of gateway devices associated with each of the at least one of the access points,
determine preferences for at least one of the plurality of the gateway devices of the group based on the network topology, and
inform a network management node about the detailed preferences for at least one of the plurality of gateway devices,
wherein at least one of the plurality of gateway devices is collocated at one of the access points such that the at least one of the plurality of gateway devices and the access point are a common device.

2. The radio access network device according to claim 1, wherein the at least one memory and the computer program code are configured, with the at least one processor, to cause the apparatus at least to:
determine the preferences for the at least one of the plurality of gateway devices under consideration of the access points supported;
filter the access points supported by a particular one of the plurality of gateway devices based on the preferences for the at least one of the plurality of the gateway devices;
select a preferred one of the plurality of the gateway devices for at least one of the access points from the filtered access points; and
inform the network management node about the selected preferred one of the plurality of the gateway devices for each of the supported at least one access points.

3. The radio access network device according to claim 1, wherein the at least one memory and the computer program code are configured, with the at least one processor, to cause the apparatus at least to:
determine the preferences for a respective one of the plurality of gateway devices independent of the access points supported by the respective one of the plurality of gateway devices; and
inform the network management node by sending addresses of the plurality of gateway devices in the order of the determined preferences.

4. The radio access network device according to claim 1, wherein the at least one memory and the computer program code are configured, with the at least one processor, to cause the apparatus at least to:
determine the preferences for a respective one of the plurality of gateway devices in terms of a preference for the access points supported by the respective one of the plurality of the gateway devices; and
inform the network management node by sending addresses of the respective one of the plurality of gateway devices together with a respective indication of the preferences for each of the at least one of the access points supported by a gateway device.

5. A method, comprising:
maintaining at a radio access network device configuration data of a plurality of gateway devices and access points, with which the radio access network device has connectivity, each of the at least one of the access points being associated to at least one of the plurality of gateway devices, wherein at least the radio access network device and the plurality of gateway devices form part of a network having a network topology,
receiving at the radio access network device a request for connection via at least one of the access points from a terminal,
determining by the radio access network device a group from the plurality of gateway devices associated with each of the at least one access points,
determining by the radio access network device preferences for at least one of the plurality gateway devices of the group based on the network topology, and
informing a network management node about the detailed preferences for at least one of the plurality gateway devices via the radio access network device,
wherein at least one of the plurality of gateway devices is collocated at one of the access points such that the at least one of the plurality of gateway devices and the access point are a common device.

6. The method according to claim 5, further comprising:
determining at the radio access network device the preferences for the at least one of the plurality of gateway devices under consideration of the access points supported;
filtering at the radio access network device the access points supported by a particular one of the plurality of the gateway devices based on the preferences for the at least one of the plurality of gateway devices;
selecting by the radio access network device a preferred gateway device for at least one of the access points from the filtered access points; and
informing with the radio access network device the network management node about the selected preferred one of the plurality of gateway devices for each of the at least one supported access points.

7. The method according to claim 5, further comprising:
determining at the radio access network device the preferences for the respective one of the plurality of gateway devices independent of the access points supported by the respective one of a plurality of gateway devices, and
informing at the radio access network device the network management node by sending addresses of the plurality of gateway devices in the order of the determined preferences.

8. The method according to claim 5, further comprising:
determining at the radio access network device the preferences for a respective one of the plurality of gateway devices in terms of a preference for the access points supported by the respective one of the plurality of gateway devices; and
informing at the radio access network device the network management node by sending addresses of the respective plurality of gateway devices together with a respective indication of the preferences for each of the at least one of the access points supported by a gateway device.

9. A computer program product including a program comprising software code portions being arranged, when run on a processor of a device, to perform the method according to claim 5.

* * * * *